(12) United States Patent
Mori et al.

(10) Patent No.: US 7,084,995 B2
(45) Date of Patent: Aug. 1, 2006

(54) PRINT LAYOUT DEVICE, PRINT LAYOUT METHOD, AND STORAGE MEDIUM

(75) Inventors: Yasuo Mori, Tokyo (JP); Koji Nakagiri, Kawasaki (JP); Satoshi Nishikawa, Kawasaki (JP); Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 09/863,462

(22) Filed: May 24, 2001

(65) Prior Publication Data

US 2001/0024291 A1 Sep. 27, 2001

Related U.S. Application Data

(62) Division of application No. 09/123,365, filed on Jul. 28, 1998.

(30) Foreign Application Priority Data

Jul. 30, 1997 (JP) .............................. 9-218318
Jul. 10, 1998 (JP) .......................... 10-195715

(51) Int. Cl.
*G06F 15/00* (2006.01)

(52) U.S. Cl. ..................................... 358/1.15; 358/1.18
(58) Field of Classification Search ................ 358/1.12, 358/1.13, 1.14, 1.15, 1.18, 448, 452, 401, 358/1.1; 707/517, 520, 521, 527
See application file for complete search history.

(56) References Cited

U.S. PATENT DOCUMENTS 4,778,288 A 10/1988 Nakamura .................... 400/76
4,928,252 A * 5/1990 Gabbe et al. ................ 364/519
5,105,283 A * 4/1992 Forest et al. ................. 358/401
5,634,091 A 5/1997 Sands et al. ................. 395/117
5,732,197 A 3/1998 Nakagiri ..................... 358/1.11
5,825,996 A * 10/1998 Davis et al. ................ 358/1.18
5,839,033 A * 11/1998 Takahashi et al. .......... 399/197
5,963,216 A 10/1999 Chiarabini et al. .......... 358/1.9
5,995,721 A 11/1999 Rourke et al. ............. 358/1.15
6,101,513 A * 8/2000 Shakib et al. ................ 707/527

FOREIGN PATENT DOCUMENTS

| EP | 0 330 343 | 8/1989 |
| EP | 0 477 569 | 4/1992 |
| JP | 7-66968 | 3/1995 |
| JP | 8-187913 | 7/1996 |
| JP | 8-286860 | 11/1996 |

* cited by examiner

*Primary Examiner*—Mark Wallerson
(74) *Attorney, Agent, or Firm*—Fitzpatrick, Cella, Harper & Scinto

(57) ABSTRACT

Provided are a print layout device, a print layout method and a storage medium therefor with which all data can always be printed by ensuring that data to be printed do not extend out beyond the limits of a printable area, as may occur when the conventional margin setting process is used, with which a margin can be set by employing an additional special print method, such as an N-up print method, and with which a binding margin can be set for bookbinding. In addition, provided is a configuration for implementing those apparatuses and devices without modifying the conventional portions. A host computer comprises a despooler, which calculates a printable area using margin parameters set by a user, enlarges/reduces print data in consonance with the obtained printable area, performs a layout for the resultant data to be printed and margins on a sheet, and prints the data using that layout. The despooler outputs prepared drawing data to a graphic engine to provide a printer driver in a conventional manner.

10 Claims, 10 Drawing Sheets

MARGIN SET FOR BINDING

FIG. 10
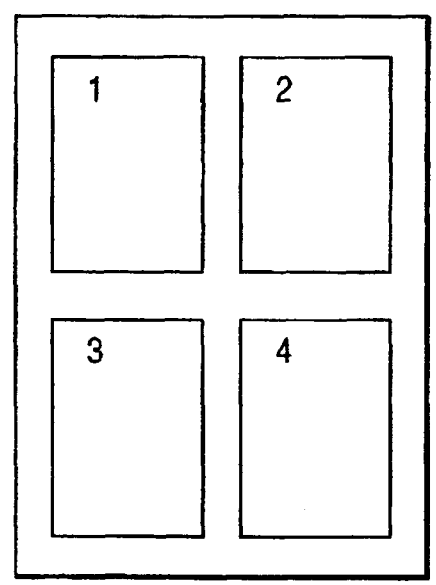
STANDARD 4-PAGE PRINTING
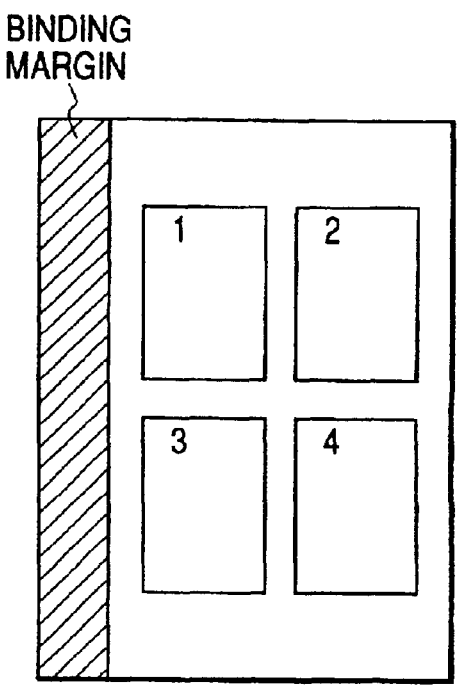
BINDING MARGIN
4-PAGE PRINTING WITH BREADTHWISE BINDING MARGIN

PRINT LAYOUT DEVICE, PRINT LAYOUT METHOD, AND STORAGE MEDIUM

This application is a divisional of application Ser. No. 09/123,365, filed Jul. 28, 1998.

BACKGROUND OF THE INVENTION

1. Field of the Invention

The present invention relates to a print layout device, a print layout method and a storage medium, and in particular to a print layout device, a print layout method and a storage medium that are appropriate for a system constituted by an information processing apparatus, such as a personal computer, and a printer for printing data for which an optimal margin is set.

2. Related Background Art

Conventionally, for printing, a binding margin is set simply by shifting a print position horizontally or vertically a distance equivalent to the binding margin. Therefore, when a specific binding margin has been set, data to be printed may extend out beyond the limits of the printable area on a sheet. And when a binding margin is located in the center of a sheet, as is a margin for bookbinding, setting the margin is not possible.

The following problems are inherent to the above prior art. Since, as is described above, the print position is simply shifted horizontally or vertically when setting a margin, for a specific margin, data to be printed extend out beyond the limits of a printable area when the print position has been shifted, and some data are not printed.

Furthermore, to staple the left upper corner of a sheet, for example, a margin is generally set that it is shifted to the right and down (a compound directional movement to the right and down). With the conventional margin setting process, however, margins can be set only vertically and horizontally (along the long side and the short side of a sheet). In addition, since only vertical and horizontal margins can be set, a binding margin can not be set for that portion of a sheet that is folded once for bookbinding.

SUMMARY OF THE INVENTION

To resolve the above shortcomings, it is one objective of the present invention to provide a print layout device, a print layout method and a storage medium therefor with which all data can always be printed by ensuring that data to be printed do not extend out beyond the limits of a printable area, as may occur when the conventional margin setting process is used; with which a margin can be set by employing in addition a special print method, such as an N-up print method; and with which a binding margin can be set for bookbinding.

It is another objective of the present invention to provide a system wherein, upon receiving from a user an instruction for the printing of a margin, an information processing apparatus, such as a host, can prepare data for margin printing, and can output to a printer the data that are to be printed.

It is an additional objective of the present invention to provide, without a new printer driver being prepared for a conventional printer that has no margin print function, a system that can instruct margin printing and obtain as an output a result desired by a user, i.e., a portion for preparing a PDL (Page Description Language) from a DDI (Device Driver Interface) function that is output by a graphic engine, or rather, a GDI (Graphical Device Interface).

To achieve the above objectives, according to the present invention, a print layout device for providing a layout for a recording sheet comprises:

setting means for setting a margin for a sheet;

determination means for ascertaining the size of a printable area based on the margin that is set;

enlargement/reduction means for enlarging or reducing data to be printed in consonance with the printable area; and layout means for providing a layout for the margin for the sheet and for the data to be printed that are enlarged or reduced, and for employing the layout to control the printing.

To achieve the above objectives, according to the present invention, the setting means is capable of independently setting vertical and horizontal margins for a sheet.

To achieve the above objectives, according to the present invention, the setting means is capable of setting a binding margin adjacent to the line of the fold in a sheet that is folded once.

To achieve the above objectives, according to the present invention, the setting means is capable of setting margins that are equidistant from the line of the fold in the center of a sheet that is folded once.

To achieve the above objectives, according to the present invention, the enlargement/reduction means enlarges or reduces data to be printed using an enlargement/reduction ratio that provides a maximum inclusive area that does not exceed the limits of a printable area.

To achieve the above objectives, according to the present invention, the enlargement/reduction means employs a designated, arbitrary enlargement/reduction ratio to enlarge or reduce the data to be printed.

To achieve the above objectives, according to the present invention, the enlargement/reduction means so enlarges or reduces the data to be printed that the ratio of the length and the width of the data, after being enlarged or reduced, to that of the original data is not changed.

To achieve the above objectives, according to the present invention, the layout means centers the enlarged or reduced data to be printed in an area on a sheet that excludes the binding margins, and performs the layout process.

To achieve the above objectives, according to the present invention, a print layout device further comprises storage means for storing size information for data to be printed that is used for the determination of an enlargement/reduction ratio.

To achieve the above objectives, according to the present invention, when a size for data to be printed and a sheet size differ, the enlargement/reduction means employs the size of the data to be printed and the sheet size to obtain an enlargement/reduction ratio for providing the binding margin, and the layout means performs a layout process for a sheet based on the enlargement/reduction ratio that is obtained and, in accordance with the layout, prints out the data to be printed.

To achieve the above objectives, according to the present invention, the layout means prints data for a plurality of pages on one sheet using a layout for a sheet for which a margin has been set.

To achieve the above objectives, according to the present invention, the layout means is capable of adjusting the position of binding margins on the obverse and the reverse sides of a sheet, so that for double-sided printing the binding margin will be located at the same position on the sheet.

To achieve the above objectives, to perform a printing process the present invention can be applied for a system by which the data to be printed can be transmitted by an upper-level device, such as a computer, to a printing device, such as a printer.

To achieve the above objectives, the present invention comprises:

saving means for temporarily saving data in an intermediate code form that differs from that for the data to be printed; and preparation means for preparing data to be printed based on the data that are temporarily saved.

To achieve the above objectives, according to the present invention, a print layout device for performing a layout process for a recording sheet comprises:

dispatcher means for receiving, from drawing means and depending on which OS is used, common print information that is generated and is based on drawing data prepared by an arbitrary application;

intermediate data conversion means for converting into intermediate data the print information received by the dispatcher means and for storing the intermediate data in spooling means;

setting means for setting a margin for the sheet;

processing means for processing the intermediate data stored in the spooling means in consonance with a printable area based on the margin that is acquired, and for outputting the processed intermediate data in the drawing data form to the drawing means; and print data generation means for converting the print information received by the dispatcher means into print data consisting of a control command and for outputting the print data to an external device.

To achieve the above objectives, according to the present invention, the processing means changes the size of the intermediate data to a maximum size that is available in the printable area and for which the ratio of the width and the length of the drawing data is not changed.

To achieve the above objectives, according to the present invention, the drawing data are GDI (Graphical Device Interface) data.

To achieve the above objectives, according to the present invention, the print information is DDI (Device Driver Interface) information.

To achieve the above objectives, according to the present invention, the data to be printed are written in a page description language.

BRIEF DESCRIPTION OF THE DRAWINGS

FIG. 10 is an explanatory diagram showing an example output, according to the second embodiment of the present invention, when N-up printing and margin setting are combined.

DETAILED DESCRIPTION OF THE PREFERRED EMBODIMENTS

Figure 1:
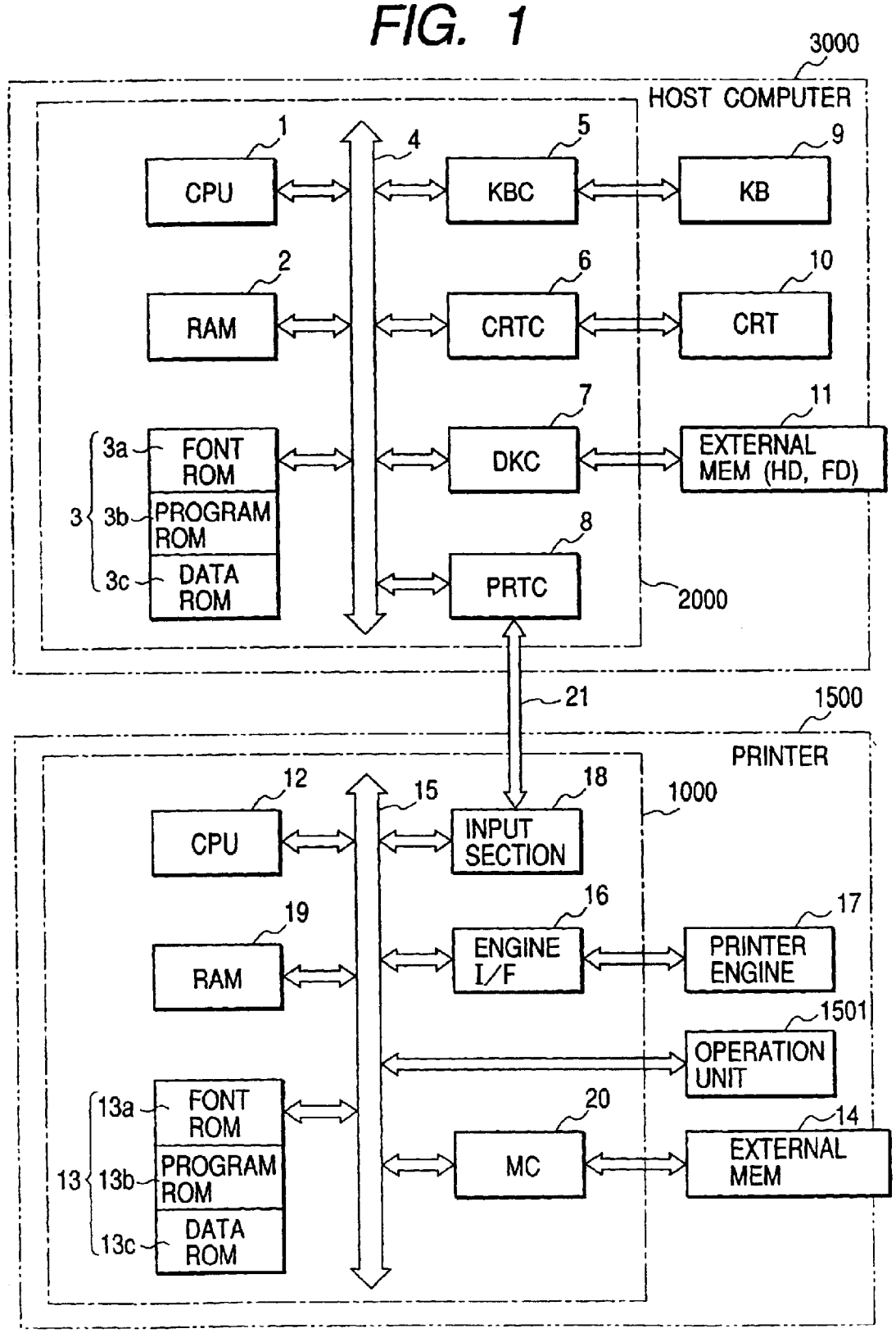
FIG. 1 is a block diagram illustrating the general arrangement of a printer control system according to a first and a second embodiments of the present invention.

The preferred embodiments of the present invention will be described while referring to the drawings.

[1] First Embodiment

The arrangement of a printer control system according to the first embodiment of the present invention will now be described while referring to the block diagram in FIG. 1. So long as the function of the present invention can be implemented, the present invention can be applied for a single apparatus, for a system constituted by a plurality of apparatuses, or for a system for performing processing across a network, such as a LAN (Local Area Network) or a WAN (Wide Area Network).

The present invention can be applied for an FD (a Floppy Disk), a CD-ROM (a Compact Disk ROM), an Internet Web site, or a BBS (a Bulletin Board System: a message exchange system using computers), such as Nifty Serve. That is, a program according to the present invention can be supplied to the printer control system on an FD or a CD-ROM, or the printer control system can be connected to the Internet or to Nifty Serve.

The printer control system according to the first embodiment is constituted by a host computer 3000 and a printer 1500. The host computer 3000 comprises: a CPU 1; a RAM 2; a ROM 3; a keyboard controller (KBC) 5, a CRT controller (CRTC) 6; a disk controller (DKC) 7; a printer controller (PRTC) 8; a keyboard (KB) 9; a CRT display (CRT) 10; and an external memory 11. The printer 1500 comprises: a CPU 12; a RAM 19; a ROM 13; an input section 18; an engine interface (I/F) 16; a memory controller (MC) 20; a printer engine 17; an operating unit 1501; and an external memory 14.

First, the individual sections of the host computer 3000 will be described in detail. The CPU 1 is a central processing unit for the overall control of those devices that are connected to a system bus 4. The CPU 1 employs a document processing program stored in a program ROM 3b (which will be described later) in the ROM 3, or in an external memory 11, to process documents consisting of mixtures of graphics, images, characters and charts (including table calculations). In addition, the CPU 1 performs development (rasterization) for an outline font into, for example, a display data RAM set in the RAM 2 to enable WYSIWY (What You See Is What You Get: a function for printing data having the sizes and the shapes seen on the CRT display screen) for the CRT display 10.

Furthermore, the CRT 10 opens various registered windows in response to a command designated using a mouse cursor (not shown) on the CRT display 10, and performs various data processes. When a user prints data using the printer 1500, he or she can open a window for the setup for printing, and can set a printing method for a printer driver, including the reference for the printer 1500 and the selection of a print mode.

The RAM 2 serves as the main memory or as a work area for the CPU 1. The ROM 3 includes a font ROM 3a, a program ROM 3b and a data ROM 3c. In the font ROM 3a or the external memory 11 are stored font data that are used for the document process. In the program ROM 3b or the external memory 11 is stored an operating system (hereinafter referred to as an OS), which is a control program for the CPU 1. In the data ROM 3c or the external memory are stored various data used for the document process, etc.

The keyboard controller (KBC) 5 controls the entry of data at the keyboard 9 or a pointing device (not shown). The CRT controller (CRTC) 6 controls the display on the CRT display 10. The disk controller (DKC) 7 controls the access of the external memory 11. The printer controller (PRTC) 8 is connected to the printer 1500, via the bidirectional interface 21, for communication with the printer 1500. Provided for the keyboard 9 are a variety of keys.

The CRT display (CRT) 10 displays graphics, images, characters and charts. The external memory 11 includes a hard disk (HD) and a floppy disk (FD), and is used to store a boot program, various application programs, font data, a user file, an editing file, and a printer control command generation program (hereinafter referred to as a printer driver).

The above described CPU 1, RAM 2, ROM 3, keyboard controller (KBC) 5, CRT controller (CRTC) 6, disk controller (DKC) 7, and printer controller (PRTC) 8 are arranged in the computer control unit 2000.

The individual sections of the printer 1500 will now be described in detail. The CPU 12 is a central processing unit that controls all the devices connected to the system bus 15, and that employs a control program stored in a program ROM 13b (which will be described later) in the ROM 13, or a control program stored in the external memory 14, to output an image signal as output data to the printer engine 17. In addition, the CPU 12 can communicate with the host computer 3000 via the input section 18 and can transmit data available at the printer 1500 to the host computer 3000.

The RAM 19 serves as a main memory or a work area for the CPU 12, and its memory capacity can be expanded, using an optional RAM (not shown) that is connected to an expansion port. The RAM 19 is employed as an output data development area, an environmental data storage area, an NVRAM, etc. The ROM 13 includes a font ROM 13a, a program ROM 13b, and a data ROM 13c. In the font ROM 13a are stored font data used to generate the output data: in the program ROM 13b is stored a control program for the CPU 12; and in the data ROM 13c is stored information used by the host computer 3000 when no external memory 14, such as a hard disk, is connected to the printer 1500.

The input section 18 is used for the exchange of data, via the bidirectional interface 21, by the printer 1500 and the host computer 3000: the engine interface (IF) 16 is used for the exchange of data by the CPU 12 and the printer engine 17; the memory controller (MC) 20 controls access to the external memory 14; the printer engine 17 conducts printing under the control of the CPU 12; and the operating unit 1501 includes various operating switches and display means (e.g., an LED display).

The external memory 14 is constituted by a hard disk (HD) and an IC card, and is optionally connected to the printer 1500. The external memory 14 is used to store font data, emulation data and form data, and access to it is controlled by the memory controller (MC) 20. It should be noted that more than one external memory 14 can be provided. In other words, a plurality of external memories, in which are stored not only built-in fonts but also an option card and a program for interpreting different printer control languages, may be connected to the printer 1500. In addition, the external memory 14 may include NVRAM (not shown) and may be used to store printer mode setup data entered via the operating unit 1501.

The above described CPU 12, RAM 19, ROM 13, input section 18, engine interface (I/F) 16, and memory controller (MC) 20 are arranged in the printer control unit 1000.

Figure 2:
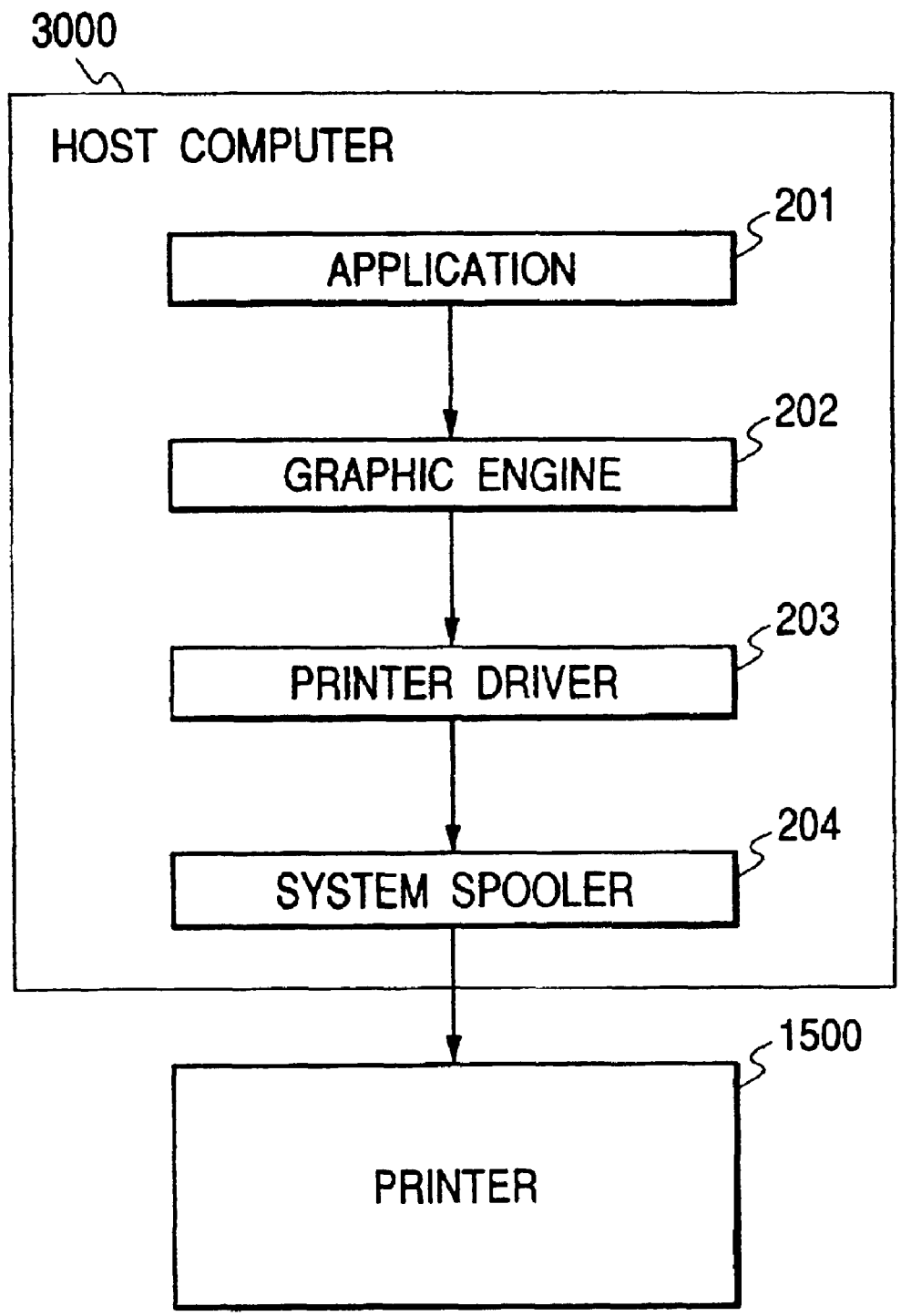
FIG. 2 is a block diagram illustrating an arrangement for a typical printing process performed by a host computer according to the first and the second embodiments of the present invention.

FIG. 2 is a block diagram showing a typical configuration for printing processing performed by the host computer 3000 for which printers and other printing devices are connected in series or across a network. In FIG. 2, an application 201, a graphic engine 202, a printer driver 203, and a system spooler 204 exist as files saved in the external memory 11 in FIG. 1, and are loaded into the RAM 2 and are executed by the OS or by corresponding modules.

The application 201 and the printer driver 203 can supplement the HD of the external memory 11 by employing an FD or a CD-ROM available in the external memory or across a network (none of them is shown). The application 201, which is stored in the external memory 11, is loaded into the RAM 2 and executed; however, in order to use the printer 1500 to perform printing upon the execution of the application 201, the graphic engine 202, which is also loaded into the RAM 2, is employed to output data (graphic data).

The graphic engine 202 also transfers the printer driver 203 that is prepared for each printing device from the external memory 11 to the RAM 2, and directs the output of the application 201 to the printer driver 203. The graphic engine 202 then transforms a GDI (Graphic Device Interface) function received from the application 201 into a DDI (Device Driver Interface) function, which is output to the printer driver 203. The printer driver 203 transforms the DDI function received from the graphic engine 202 into a control command that the printer 1500 can recognize, such as a PDL (Page Description Language). The obtained printer control command is transmitted as print data from the system spooler 204, which is loaded into the RAM 2 by the OS, through the interface 21 to the printer 1500.

Figure 3:
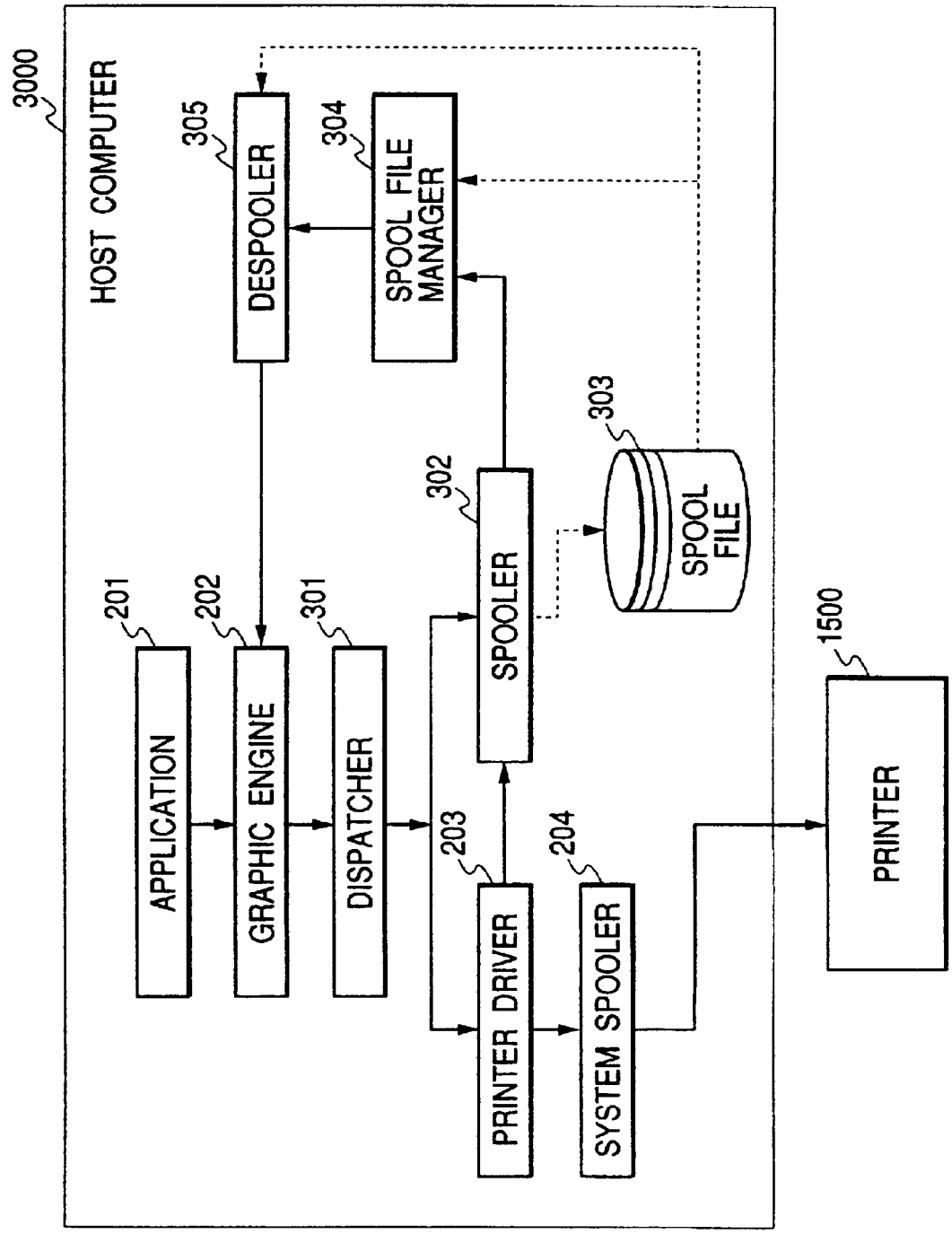
FIG. 3 is a block diagram illustrating a configuration according to the first and the second embodiments of the present invention for temporarily spooling a print command issued by an application as intermediate code before the print command is converted into a printer control command.

In addition to the printing system constituted by the printer 1500 and the host computer 3000 shown in FIGS. 1 and 2, the printer control system according to the first embodiment includes the arrangement shown in FIG. 3 in which print data provided by an application are temporarily spooled using intermediate code data.

In FIG. 3 is shown an expansion of the system in FIG. 2 wherein a spool file 303 consisting of intermediate code is generated before a print command is transmitted from the graphic engine 202 to the printer driver 203. In the system in FIG. 2 the application 201 is released from the printing process when the printer driver 203 has converted all the print commands received from the graphic engine 202 into control commands for the printer 1500.

On the other hand, in the system in FIG. 3, the application 201 is released from the printing process when the spooler 302 has converted all the print commands into intermediate code data and has output them to the spool file 303. Usually, the latter system requires a shorter processing time. Furthermore, the system in FIG. 3 can process the contents of the spool file 303. As a result, the functions that are not provided by the application, such as an enlargement/reduction function and N-up printing for reducing to one page a plurality of pages to be printed, can be performed for print data received from the application.

In order to implement these functions, the system in FIG. 2 is expanded so that print data are spooled using intermediate code data, as is shown in FIG. 3. For processing the print data, generally, the data is set in a window that is provided by the printer driver 203, and the printer driver 203 stores the setup contents in the RAM 2 or the external memory 11.

A detailed explanation will be given for the system in FIG. 3. In the expanded processing system, a dispatcher 301 receives a print command from the graphic engine 202. When the print command that the dispatcher 301 has received from the graphic engine 202 is a print command issued by the application 201 to the graphic engine 202, the dispatcher 301 loads into the RAM 2 the spooler 302 stored in the external memory 11, and transmits the print command to the spooler 302, not to the printer driver 203.

The spooler 302 converts the received print command into intermediate code and outputs the code to the spool file 303. Subsequently, the spooler 302 obtains from the printer driver 203 the processing setup for the print data for the printer driver 203, and stores the setup data in the spool file 303. It should be noted that the spool file 303 is generated as a file in the external memory, but may rather be generated in the RAM 2. The spooler 302 also loads into the RAM 2 a spool file manager 304, which is stored in the external memory 11, and notifies this spool file manager 304 of the generation condition of the spool file 303.

The spool file manager 304 examines the contents of the print data processing setup that is stored in the spool file 303 to determine whether the printer driver 203 can prepare print data. The spool file 303 manages intermediate code for each logical page that is output by the application, and as was previously mentioned, manages processing reference material that the user designates for the printer driver 203, e.g., the setup of marginal printing (the direct printing of drawing data on one page, or the printing of data while the data size is reduced and shifted). Therefore, if logical pages that are required in accordance with the processing references stored in the spool file 303 are managed in the spool file 303, all the pages required for the preparation of print data are obtained, so that it can be ascertained that the printer driver 203 can prepare print data. When the spool file manager 304 employs the graphic engine 202 to determine that the print driver 203 can create print data, the spool file manager 304 loads into the RAM 2 a despooler 305 stored in the external memory 11, and instructs the despooler 305 to print intermediate data that are described in the spool file 303. At this time, the spool file manager 304 also instructs the despooler 305 to process information for the effect given on a logical page that is accompanied by the processing reference. When, for example, marginal printing is designated, the spool file manager 304 calculates position information designating a location on a physical page at which a logical page is to be printed and size information specifying the size of a logical page relative to a physical page, and instructs the despooler 305 to calculate the effect information for each physical page, including the position information and the size information. The calculation of the position information will be described later while referring to FIGS. 5 and 6.

The despooler 305 processes the intermediate code included in the spool file 303 in accordance with the contents of the effect information instructed by the spool file manager 304, transforms the processed intermediate code into a GDI function, and outputs the function to the graphic engine 202. The despooler 305 then employs the logical page obtained from the spool file 303 and the effect information obtained from the spool file manager 304 to re-calculate the location and the size, on a physical page, of character data that are drawn on the logical page. Specifically, the data size is changed by a variable magnification in accordance with the setup of the margin. When margins are provided at the right and the left, and at the top and the bottom, the size of the data is calculated so that on one of sides it occupies the maximum space available in the printable area. The despooler 305 identifies the location on the physical page of a logical page that is assigned by using the position information for the logical page, and acquires the location of the data on the logical page by multiplying the distance by a variable magnification. The despooler 305 transforms the thus obtained intermediate data into a GDI function, and outputs the function to the graphic engine 202. The graphic engine 202 generates a DDI function by using the GDI function received from the despooler 305, and outputs to the dispatcher 301 a print command constituting a DDI function. When the DDI function print command transmitted by the graphic engine 202 to the dispatcher 301 is one consisting of the GDI function issued by the despooler 305 to the graphic engine 202, the dispatcher 301 transmits the print command to the printer driver 203, not to the spooler 302. The printer driver 203 then employs the received print command to generate print data consisting of a printer control command, and outputs the data to the printer 1500 via the system spooler 204.

Figure 11:
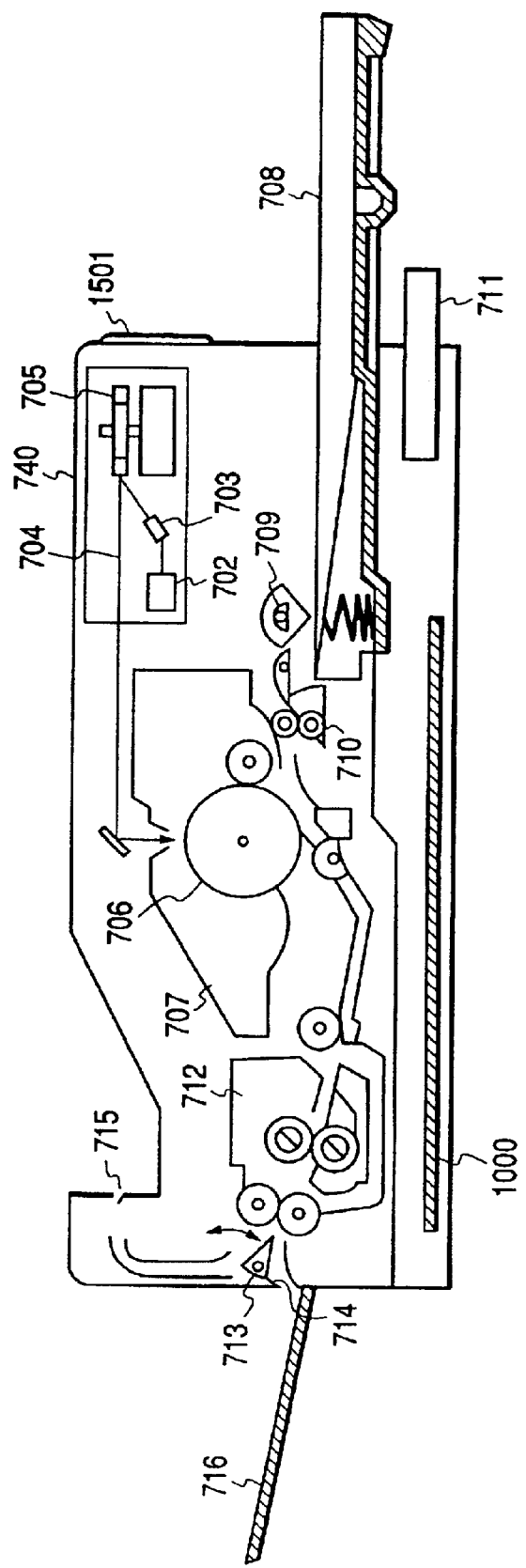
FIG. 11 is a cross-sectional view of the internal arrangement of a printer according to the first and the second embodiment of the present invention.

FIG. 11 is a cross-sectional view of the internal structure of a laser beam printer (hereinafter referred to as an LBP), which is one example of the printer 1500 according to the first embodiment. The printer 1500, which is the LBP, can print data for an input character pattern on a recording sheet. In the printer 1500, an LBP body 740, which forms an image on a recording sheet based on a received printer control command, comprises: a printer control unit 1000; an operation unit 1501; a laser driver 702; a semiconductor layer 703; a rotary polyhedric mirror 705; an electrostatic drum 706; a developing unit 707; a sheet cassette 708; a paper feed roller 709; a delivery roller 710; an external memory 711; a fixing unit 712; a switching wedge 713; a face-up discharging unit 714; a face-down discharging unit 715; and a discharging tray 716.

The structures and the operations of the individual sections will now be described in detail. The printer control unit 1000 controls the entire LBP body 740, and analyses character pattern information, mainly converting a printer control command into a video signal and outputting it to the laser driver 702. The printer control unit 1000 can be connected to the external memory 711 in which are stored font data and an emulation program for a page description language. Operating switches and display means (e.g., an LED display) are arranged for the operating unit 1501, as is described above.

The laser driver 702 consists of a circuit for driving the semiconductor laser 703, and in consonance with a received video signal, changes the ON/OFF state of a laser beam 704 that is emitted by the semiconductor laser 703. The semiconductor laser 703 emits the laser beam 704 which strikes the rotary polyhedric mirror 705. The rotary polyhedric mirror 705 split the laser beam 704 into a right and a left portion for scanning the electrostatic drum 706. When the electrostatic drum 706 is scanned by the laser beam 704, an electrostatic latent image corresponding to a character pattern is formed on the surface of the drum 706.

The developing unit 707 is arranged around the electrostatic drum 706 and develops an electrostatic latent image that is thereafter transferred to a recording sheet. The sheet cassette 708 is used, for example, to store cut-sheet recording paper. The paper feed roller 709 and the delivery roller 710 feed the cut-sheet paper from the sheet cassette 708 into the LBP body 740, and supply it to the electrostatic drum 706. In this case, the cut-sheet recording paper can be fed from a manual feed tray (not shown) that is provided above the cover of the sheet cassette 708.

The fixing unit 712 heats a toner image that has been transferred to the cut-sheet recording paper and fixes it thereon. When the switching wedge 713 is displaced upward, the cut-sheet recording paper on which the image is formed is discharged to the discharging tray 716 by the discharging unit 714 with the recording face up. When the switching wedge 713 is displaced downward, the cut-sheet recording paper is discharged by the face-down discharging unit 715 with the recording face down.

Figure 4:
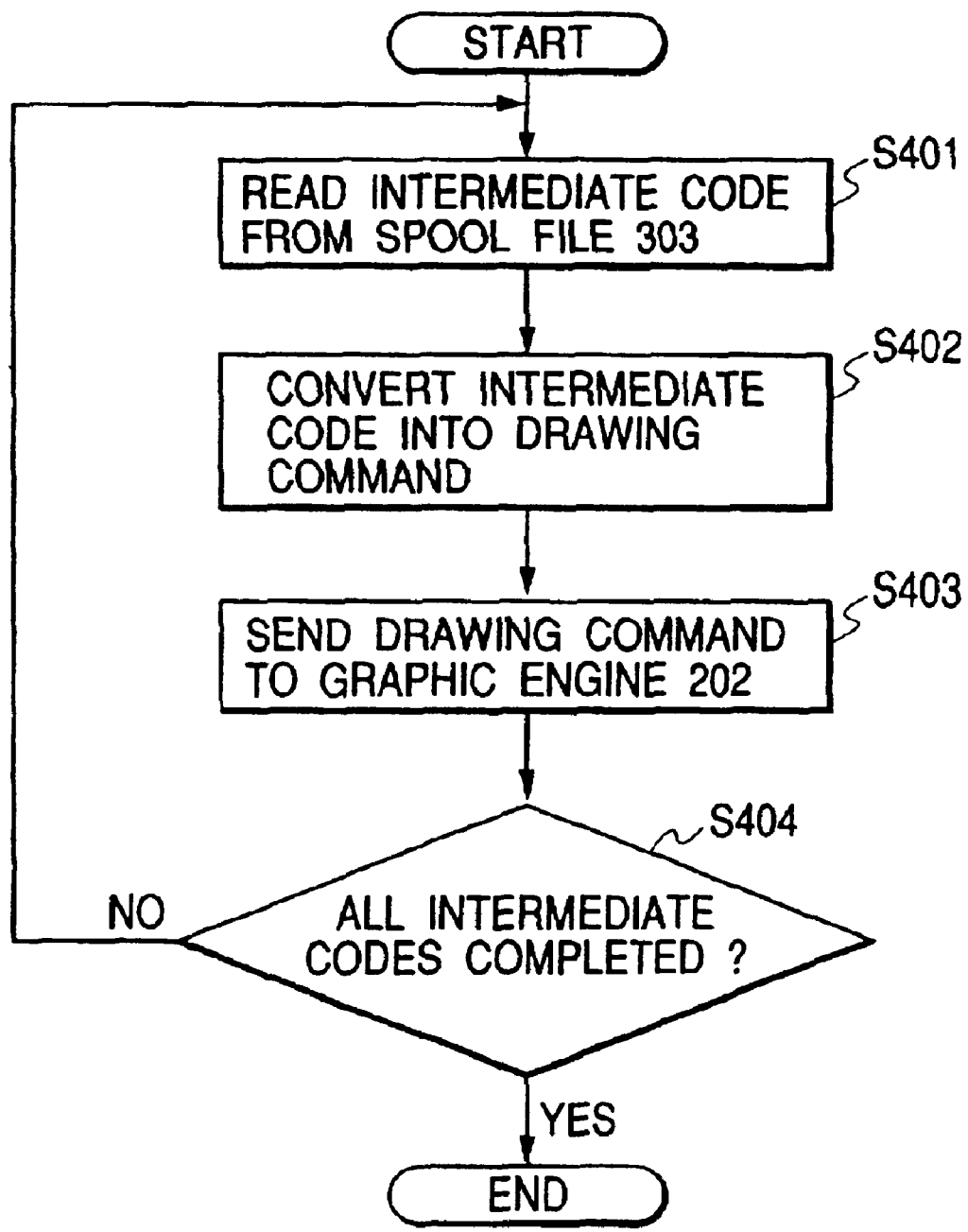
FIG. 4 is a flowchart showing despooler processing performed according to the first embodiment of the present invention.

The general processing performed by the despooler 305 of the thus structured printer control system according to the first embodiment will now be described in detail while referring to the flowcharts in FIGS. 4 and 6. FIG. 4 is a flowchart showing the processing performed by the despooler 305 when the margin process is designated at step S402 in FIG. 4.

In FIG. 4, at step S401 intermediate code included in the spool file 303 is read. At step S402 the intermediate code that is read is processed to obtain print data consonant with the contents of the processing setup that is included in the spool file 303. At step S403, a drawing command is again output to the graphic engine 202. When all the intermediate code has been output, the processing is terminated at step S404, but when some intermediate code remains, program control returns to step S401, whereat the processing for outputting the intermediate code is repeated.

Figure 6:
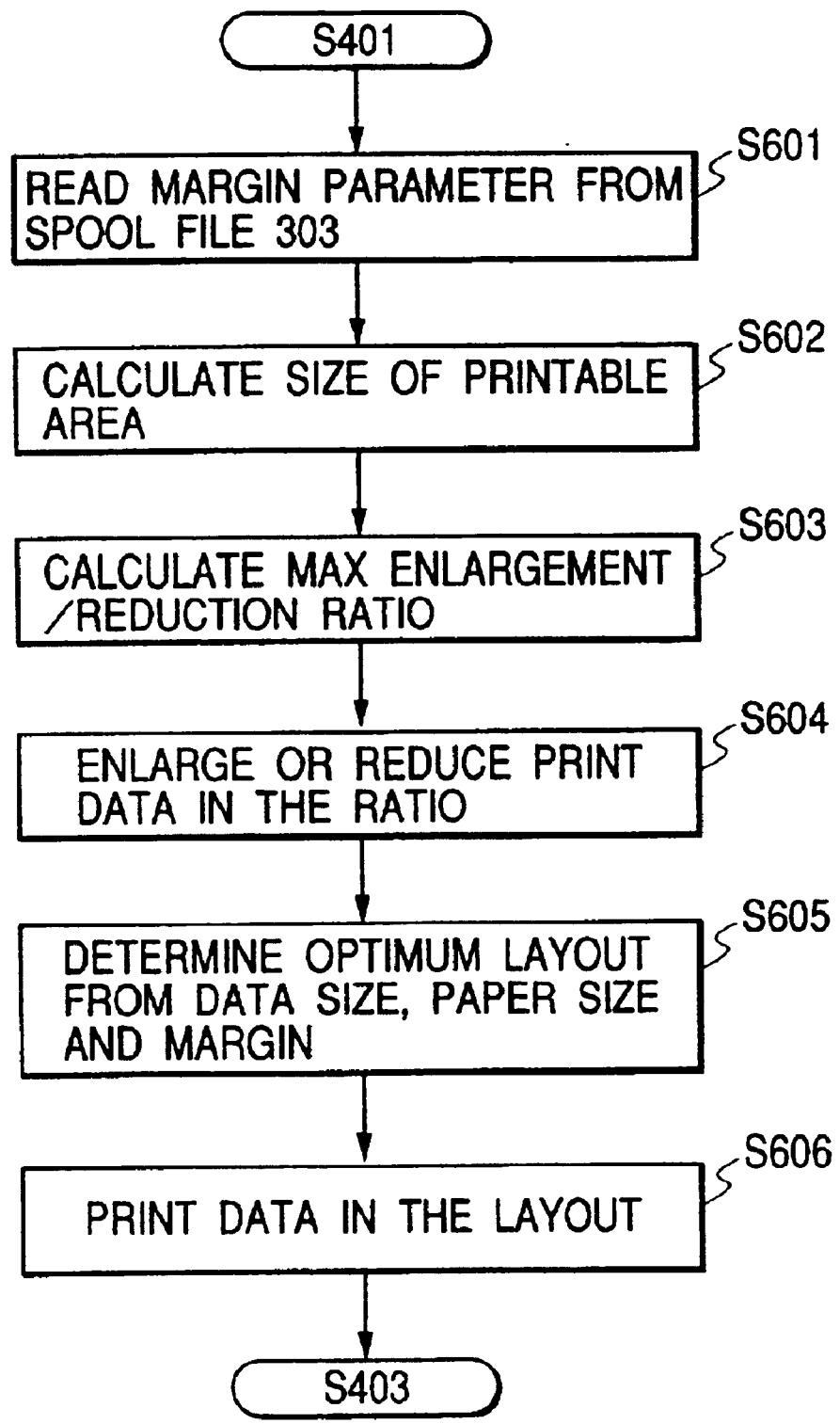
FIG. 6 is a flowchart showing the margin setting process according to the first embodiment of the present invention.

In FIG. 6, at step S601 the parameter for margins designated by the user is read from the spool file 303. At step S602 the size of an area, excluding the margins obtained at step S601, is acquired as a printable area using the size of a sheet that is currently being employed. At step S603 the size of the printable area obtained at step S602 is compared with the size of the data to be printed, and the maximum enlargement/reduction ratio that does not effect the length/breadth ratio is calculated so that as much data as possible can be printed in the printable area without distortion.

At step S604 the data to be printed are enlarged/reduced according to the enlargement/reduction ratio, and at step S605 the data to be printed are shifted and printed while taking the margin values into account. Since at step S605 the data to be printed are so enlarged/reduced that the length/breadth ratio of the original data is not changed, the data to be printed are not simply shifted a distance that is equivalent to the margin value, but, depending on the margin value, more blank space is acquired so that the print position can be determined while taking this extra space into account.

In the common printing process, there are two printable area sizes: the physical size of a sheet and the effective printing area of the printer. Accordingly, two methods are employed to calculate the size of the printable area at step S602: a method according to which margins are simply subtracted from a sheet, and a method according to which margins are subtracted from an effective printing area. Similarly, to calculate an enlargement/reduction ratio, either the size of a sheet or the effective printing area is employed as the size of the data to be printed. Further, the smallest circumscribed rectangle in which can be included all of the data to be printed can be regarded as the data size.

Figure 5:
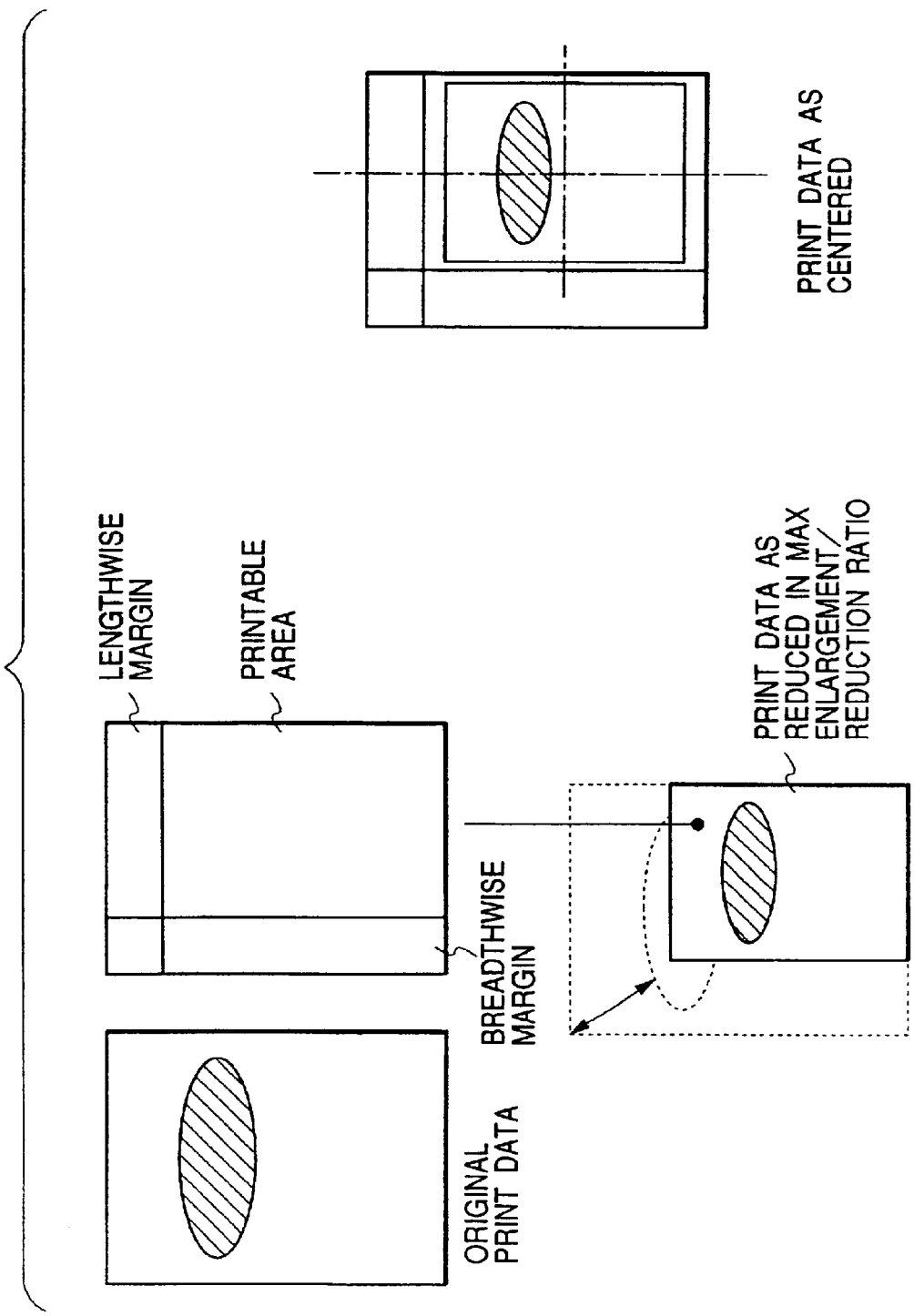
FIG. 5 is an explanatory diagram showing the concept, according to the first embodiment of the present invention, for the performance of a margin setting method for calculating an enlargement/reduction ratio and a binding margin based on a sheet size.

FIG. 5 is a diagram showing the concept of the margin setting method according to the first embodiment whereby the enlargement/reduction ratio and the binding margins are calculated based on the size of the sheet. Specifically shown is an example where both the size of the printing area and the size of print data are calculated based on the size of the sheet. That is, data to be printed are reduced at the greatest reduction ratio possible so that all the data fit in the printable area without the length/breadth ratio of the size of the sheet being changed, and so that the reduced size data are centered and do not extend outside the limits of the printable area.

When the size of a sheet to be output differs from the sheet size for the data to be printed, as in fixed enlargement/reduction, it may be difficult to obtain the sheet size for the data during the printing process. In this case, either the sheet size for the data to be printed is held in the spool file 303 and is used at step S603 to calculate the enlargement/reduction ratio, or a database for the sheet size is prepared and an examination of the size is performed based on the database.

Figure 7:
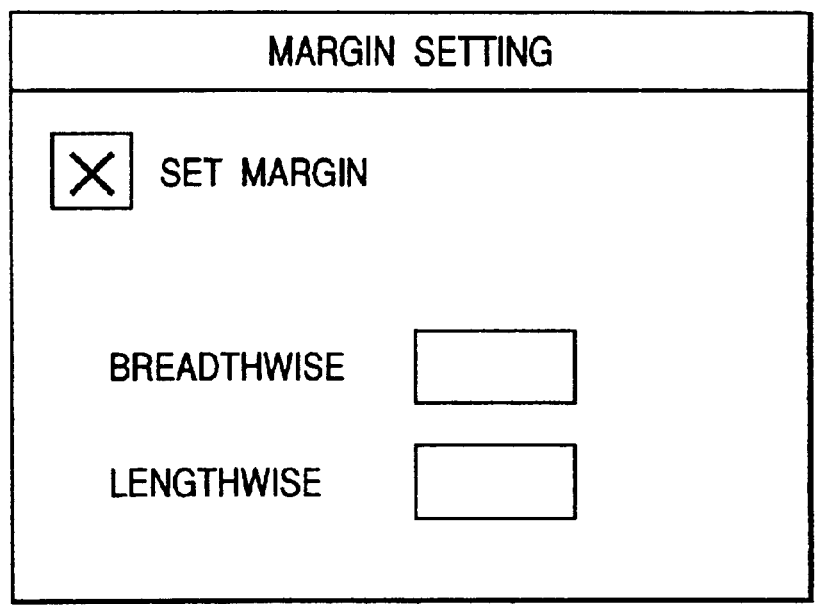
FIG. 7 is an explanatory diagram illustrating an example margin parameter acquisition means, according to the first embodiment of the present invention, for designating margin parameters for the width and the length.

FIG. 7 is a diagram showing an example margin parameter acquisition means for designating length and breadth margin parameters according to the first embodiment. In this example, when the check box for the margin setting is selected, the length and breadth margin values can be entered.

Figure 8:
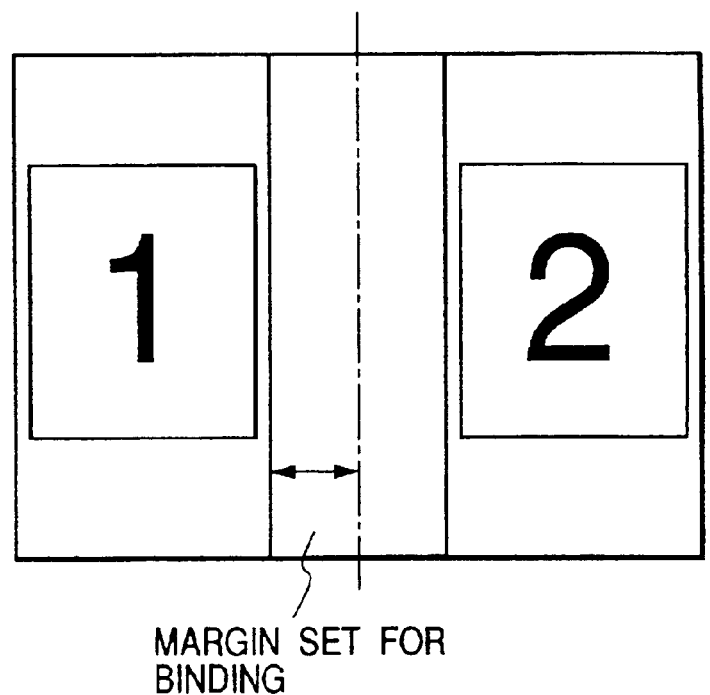
FIG. 8 is an explanatory diagram, according to the first embodiment of the present invention, showing example margin settings for bookbinding.

FIG. 8 is a diagram showing a margin setup example for bookbinding according to the first embodiment. Margins are not set at the edges of the sheet but in the center of the sheet. When the layout control for the above described margin setting process is performed, a conventional defect can be resolved that prevents the setting of a margin for bookbinding when a binding margin is located in the center of a sheet, and a binding margin can be set for bookbinding.

As is described above, according to the first embodiment, the printer control system has the despooler 305, which calculates the size of the printable area based on the margin parameters set by the user, enlarges/reduces the size of data to be printed in consonance with the obtained printable area, prepares a layout for the enlarged/reduced data to be printed and the margins on a sheet, and employs the layout to print the data. Therefore, the margins are not simply set by shifting the data to be printed vertically or horizontally, but instead the size of the data is enlarged or reduced while taking into account the reduction in the size of the printing area due to the setting of margins, and the loss of the data to be printed can be prevented. That is, even when large margins are set, the data to be printed are reduced at the greatest enlargement/reduction ratio available relative to the sheet. Therefore, all the print data can be printed, without any of the data extending outside the limits of the printable area and thus not being printed, as occurs with the conventional margin setting.

In addition, margins are not set only vertically or horizontally, but can be set for the vertical and horizontal directions. Furthermore, when a binding margin is required at the fold of a sheet that is folded once, a margin can be set at the position of the fold. Therefore, since a binding margin can be placed in the center instead of at the edges of the sheet, binding margins for bookbinding can be set.

[2] Second Embodiment

A printer control system according to a second embodiment, as in the first embodiment, comprises: a host computer 3000, which includes a CPU 1, a RAM 2, a ROM 3, a keyboard controller (KBC) 5, a CRT controller (CRTC) 6, a disk controller (DKC) 7, a printer controller (PRTC) 8, a keyboard (KB) 9, a CRT display (CRT) 10 and an external memory 11; and a printer 1500, which includes a CPU 12, a RAM 19, a ROM 13, an input section 18, an engine interface (I/F) 16, a memory controller (MC) 20, a printer engine 17, an operation unit 1501 and an external memory 14 (see FIG. 1). The control configuration of the host computer 3000 for generating data to be printed according to the second embodiment (see FIG. 2), the control configuration expanded from FIG. 2 for generating data to be printed (see FIG. 3), and the internal structure of the printer 1500 (see FIG. 11) are also the same as those in the first embodiment and no explanation for them will be given.

Figure 9:
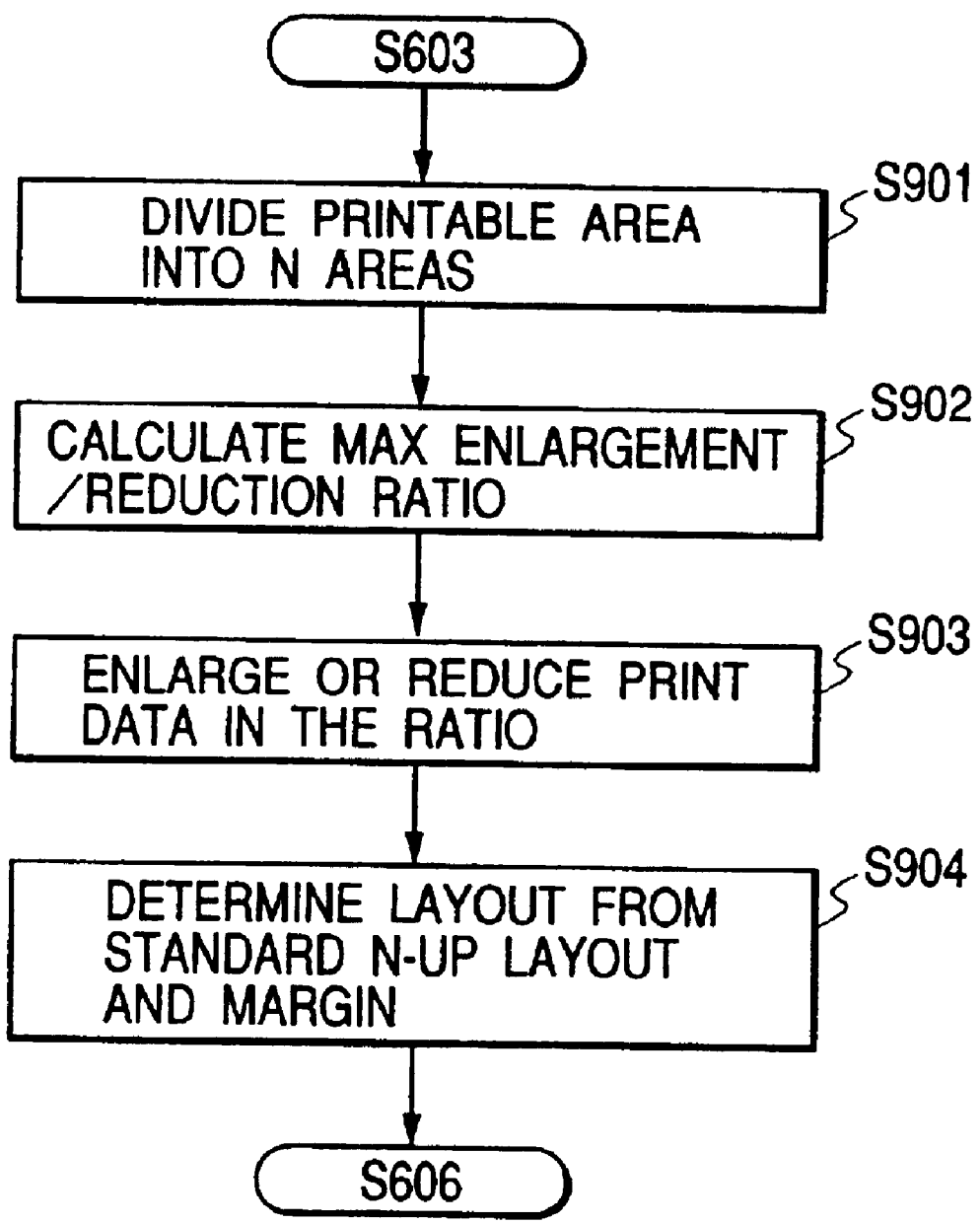
FIG. 9 is a flowchart showing the processing, according to the second embodiment of the present invention, when N-up printing and margin setting are combined.

The processing performed by the thus structured printer control system according to the second embodiment, which employs N-up printing and margin setting, will be explained while referring to the flowchart in FIGS. 9 and 6. FIG. 9 is a flowchart showing the margin setting process when N-up printing is to be performed. According to N-up printing, one sheet is divided into N areas, and a page is reduced and located in each of N areas to print data for N pages on a single sheet.

First, in FIG. 6 at step S602 the size of the printable area on a sheet, excluding the margins, is calculated. Then, at step S901 in FIG. 9 the obtained printable area is divided into N areas for N-up printing. At step S902 the N areas and an area for data to be printed are employed to calculate the maximum enlargement/reduction ratio for printing data without the length/breadth ratio of the data to be printed being unchanged. At step S903 the data to be printed are enlarged/reduced according to the enlargement/reduction ratio. At step S904 the layout process is performed to calculate the layout position while taking into account the margins for the common N-up printing layout.

FIG. 10 is a diagram showing output print examples when the N-up printing process and the margin setting process are combined according to the second embodiment. These are a standard four-page printing example and a four-page printing example with the binding margins for the width being set. When the layout control is performed during the N-up printing and margin setting process, the margin can be set even when special printing, such as N-up printing, is performed.

As is described above, according to the second embodiment, the printer control system can calculate the size of the printable area, excluding the margins, of an output sheet, divide the printable area into N areas for N-up printing, employ the N areas and data to be printed to calculate the maximum enlargement/reduction ratio for printing the data without changing the length/breadth ratio, enlarge/reduce the print data at the length/breadth ratio, and calculate the layout for the standard N-up printing while taking the margins into account. Therefore, the margin can be set by employing a combined margin setting method and special printing method, such as N-up printing or fixed enlargement/reduction printing, that accompanies an enlarged/reduced layout.

In addition, as in the first embodiment, the margins are not set simply by shifting them horizontally/vertically, and as the data to be printed are enlarged or reduced while taking into account a reduction in the size of the printing area due to the setting of the margins, the loss of data during printing can be prevented. That is, even when large margins are set, data to be printed are reduced at the maximum enlargement/reduction ratio so that the obtained size of the data does not exceed the size of the sheet. Thus, all the data can be constantly printed without the data extending outside the printable area and being lost, as occurs with the conventional margin setting. In addition, the margins are not set only horizontally/vertically, but can be combined and set for the vertical and the horizontal directions. Furthermore, when a binding margin is required along the fold of a sheet that is folded once, a margin can be set at the position of the fold. Therefore, since a binding margin can be set in the center instead of at the edge of a sheet, binding margins for bookbinding can be set.

The present invention can be applied to a system that is constituted by a plurality of devices (e.g., a host computer, an interface device, a reader and a printer), or to an apparatus (e.g., a copier, a printer or a facsimile machine) that includes a single device. The objectives of the present invention are also achieved as follows: a memory medium on which is stored software program code for implementing the functions in the previous embodiments is supplied to a system or to an apparatus, and the computer (or a CPU or an MPU) in the system or the apparatus reads the program code from the memory medium.

In this case, the program code read from the memory medium accomplishes the functions of the above described embodiments, and the memory medium on which such program code is recorded constitutes the present invention.

A memory medium for supplying such program code can be, for example, a floppy disk, a hard disk, an optical disk, a magneto optical disk, a CD-ROM, a CD-R, a magnetic tape, a nonvolatile memory card, or a ROM.

In addition, the scope of the present invention includes not only a case where the functions in the previous embodiment can be performed when program code is read and executed by the computer, but also a case where, according to an instruction in the program code, an OS (Operating System) running on the computer, etc., performs one part, or all, of the actual processing to accomplish the functions included in the above embodiments.

Furthermore, the present invention includes a case where program code, read from a memory medium, is written in a memory that is mounted on a function expansion board inserted into a computer, or a function expansion unit connected to a computer, and in consonance with a program code instruction, a CPU mounted on the function expansion board, or the function expansion unit performs one part, or all, of the actual processing in order to implement the functions included in the above described embodiments.

As is described above, according to the present invention, a print layout device for providing a layout for a recording sheet comprises: setting means for setting a margin for a sheet; determination means for ascertaining the size of a printable area based on the margin that is set; enlargement/reduction means for enlarging or reducing data to be printed in consonance with the printable area; and layout means for providing a layout for the margin for the sheet and for the data to be printed that are enlarged or reduced and for employing the layout to control the printing. Therefore, even when large margins are set, all the data can consistently be printed without the size of the print data exceeding the size of the sheet, as occurs with the conventional margin setting method.

In addition, according to the present invention, since with the setting means vertical and horizontal margins can be independently set for a sheet, as well as in the invention defined in claim 1, all the data can consistently be printed without the size of the data to be printed exceeding the size of the sheet, as occurs with the conventional margin setting method.

According to the present invention, since the setting means can set a binding margin adjacent to the line of the fold in a sheet that is folded once, a binding margin can be placed in the center of the sheet instead of along the edge. As a result, a binding margin can be set for a print style for which a binding margin must be set at the position of the fold in a double folded sheet, i.e., for bookbinding.

According to the present invention, since the setting means can set margins that are equidistant from the line of the fold in the center of a sheet that is folded once, as well as the invention defined in claim 3, a binding margin can be set for bookbinding.

According to the present invention, the enlargement/reduction means enlarges or reduces data to be printed using an enlargement/reduction ratio that provides a maximum inclusive area that does not exceed the limits of a printable area. Therefore, even when large margins are set, data to be printed are reduced at the maximum enlargement/reduction ratio so that the obtained size of the data does not exceed the size of the sheet, and all the data can consistently be printed without the data extending outside the printable area and not being printed, as occurs with the conventional margin setting method.

Furthermore, according to the present invention, since the enlargement/reduction means employs a designated, arbitrary enlargement/reduction ratio to enlarge or reduce the data to be printed, the print data can be enlarged/reduced not only at the maximum enlargement/reduction ratio that ensures the size of the data to be printed does not exceed the size of the sheet, but also at an arbitrary enlargement/reduction ratio.

According to the present invention, since the enlargement/reduction means so enlarges or reduces the data to be printed that the ratio of the length and the width of the data, after being enlarged or reduced, to that of the original data is not changed, the printing results are preferably well-balanced.

According to the present invention, since the layout means centers the enlarged or reduced data to be printed in an area on a sheet that excludes the binding margins, and performs the layout process, the printing results can fit within the printable area on the sheet, and appear well-balanced.

Further, according to the present invention, since a print layout device further comprises storage means for storing size information for data to be printed that is used for the determination of an enlargement/reduction ratio, a precise enlargement/reduction ratio can be determined.

According to the present invention, when a size for data to be printed and a sheet size differ, the enlargement/reduction means employs the size of the data to be printed and the sheet size to obtain an enlargement/reduction ratio for providing the binding margin, and the layout means performs a layout process for a sheet based on the enlargement/reduction ratio that is obtained, and, in accordance with the layout, prints out the data to be printed. A precise layout can also be used for bookbinding printing.

According to the present invention, the layout means prints data for a plurality of pages on one sheet using a layout for a sheet for which a margin has been set. Therefore, the margin can be set by a combination of the margin setting method and a special printing method, such as the N-up printing method whereby data for a plurality of pages are printed on a single sheet.

Moreover, according to the present invention, the layout means can adjust the position of binding margins on the obverse and the reverse sides of a sheet, so that for double-sided printing the binding margin will be located at the same position on the sheet. Thus, a precise binding margin can be set for double-sided printing.

In addition, to perform a printing process the present invention can be applied for a system by which the data to be printed can be transmitted by an upper-level device, such as a computer, to a printing device, such as a printer. Therefore, in such a system, all the data can be printed without the data extending outside the printable area and not being printed, as occurred in the conventional margin setting. Further, a special printing method, such as N-up printing, can be also used to set the margin. And binding margins can be set for bookbinding.

According to the present invention, a print layout device comprises: saving means for temporarily saving data in an intermediate code form that differs from that for the data to be printed; and preparation means for preparing data to be printed based on the data that are temporarily saved. Therefore, in a system wherein an upper-level device temporarily saves data in the intermediate code form and prepares and transmits print data to a print device, all the data to be printed can be printed without the data extending outside the printable area and not being printed, as occurs with the conventional margin setting. Further, a special printing method, such as N-up printing, can also be used to set a margin. And binding margins can be set for bookbinding.

According to the present invention, a print layout device for performing a layout for a recording sheet comprises: dispatcher means for receiving, from drawing means, and depending on which OS is used, common print information that is generated and is based on drawing data prepared by an arbitrary application; intermediate data conversion means for converting into intermediate data the print information received by the dispatcher means and for storing the intermediate data in spooling means; setting means for setting a margin for the sheet; processing means for processing the intermediate data stored in the spooling means in consonance with a printable area based on the margin that is acquired, and for outputting to the drawing means the processed intermediate data in the drawing data form; and print data generation means for converting the print information received by the dispatcher means into data constituted by a control command and for outputting the print data to an external device. Therefore, even when large margins are set, all the data can be printed without the data to be printed extending outside the printable area and not being printed, as occurs with the conventional margin setting method.

According to the present invention, the processing means changes the size of the intermediate data to a maximum size that is available in the printable area and for which the ratio of the width and the length of the drawing data is not changed. The printed results are preferably well-balanced.

Further, since according to the present invention the drawing data are GDI (Graphical Device Interface) data, the present invention can be applied for a system employing an application for outputting a GDI function.

In addition, since according to the present invention the print information is DDI (Device Driver Interface) information, the present invention can be applied for a system employing a graphic engine for outputting a DDI.

Since according to the present invention the data to be printed are written in a page description language, the present invention can be applied for a system for generating print data in a page description language.

What is claimed is:

1. A print layout device, which serves as a host computer, for providing a layout for a recording sheet and generating a print job to be sent to a printer, said print layout device comprising:

a margin setter adapted to set a margin for a sheet;

a spooler adapted to spool drawing commands based on a print request provided by an application in a memory;

a data re-calculator adapted to re-calculate position and distance data associated with the drawing commands spooled by said spooler in the memory for each logical page provided by the application, in consonance with a printable area of a physical page obtained based on the margin set by said margin setter; and a print job generator adapted to generate a print job comprising at least one printer control command based on the drawing commands and the position and distance data re-calculated by said data re-calculator, wherein said margin setter is capable of setting a binding margin adjacent to a center line in a sheet such that the sheet is folded along a line in the binding margin for bookbinding, and said data re-calculator re-calculates the position and distance data such that data generated based on the re-calculated position and distance data and the drawing commands are arranged in the printable area based on the binding margin.

2. A print layout device, which serves as a host computer, for providing a layout for a recording sheet and generating a print job to be sent to a printer, said print layout device comprising:

margin setting means, for setting a margin for a sheet;

spooling means to spool drawing commands based on a print request provided by an application in a memory;

data re-calculating means for re-calculating position and distance data associated with the drawing commands spooled by said spooling means in the memory for each logical page provided by the application, in consonance with a printable area of a physical page obtained based on the margin set by said margin setting means; and generating means for generating a print job comprising at least one printer control command based on the drawing commands and the position and distance data re-calculated by said data re-calculating means, wherein said margin setting means is also for setting a binding margin adjacent to a center line in a sheet such that the sheet is folded along a line in the binding margin for bookbinding, and said data re-calculating means re-calculates the position and distance data such that data generated based on the re-calculated position and distance data and the drawing commands are arranged in the printable area based on the binding margin.

3. A print layout method for providing a layout for a recording sheet and generating print job to be sent to a printer, said print layout method comprising the steps of:

setting a margin for a sheet;

spooling drawing commands based on a print request provided by an application in a memory;

re-calculating position and distance data associated with the drawing commands spooled in said spooling step in the memory for each logical page provided by the application, in consonance with a printable area of a physical page obtained based on the margin set in said margin setting step; and generating a print job sent to a printer comprising at least one printer control command based on the drawing commands and the position and distance data re-calculated in said data re-calculating step, wherein said margin setting step includes setting a binding margin adjacent to a center line in a sheet such that the sheet is folded along a line in the binding margin for bookbinding, and said data re-calculating step re-calculates the position and distance data such that data generated based on re-calculated position and distance data and the drawing commands are arranged in the printable area based on the binding margin.

4. A print layout program for providing a layout for a recording sheet and generating a print job to be sent to a printer, said print layout program comprising:

program code for setting a margin for a sheet;

program code for spooling drawing commands based on a print request provided by an application in a memory;

program code for re-calculating position and distance data associated with the drawing commands spooled in said spooling step in the memory for each logical page provided by the application, in consonance with a printable area of a physical page obtained based on the margin set by execution of said program code for margin setting; and program code for generating a print job sent to a printer comprising at least one printer control command based on the drawing commands and the position and drawing data re-calculated by execution of said program code for data re-calculating, wherein said program code for margin setting also effects setting of a binding margin adjacent to a center line in a sheet such that the sheet is folded along a line in the binding margin for bookbinding, and said program code for data re-calculating re-calculates the position and distance data such that data generated based on the re-calculated position and distance data and the drawing commands are arranged in the printable area based on the binding margin.

5. A memory medium storing computer executable instructions for performing a print layout method for providing a layout for a recording sheet and generating a print job to be sent to a printer, said print layout method comprising the steps of:

setting a margin for a sheet;

spooling drawing commands based on a print request provided by an application in a memory;

re-calculating position and distance data associated with the drawing commands spooled in said spooling step in the memory for each logical page provided by the application, in consonance with a printable area of a physical page obtained based on the margin set in said margin setting step; and generating a print job sent to a printer comprising at least one printer control command based on the drawing commands and the position and distance data re-calculated in said data re-calculating step, wherein said margin setting step includes setting a binding margin adjacent to a center line in a sheet such that the sheet is folded along a line in the binding margin for bookbinding and said data re-calculating step re-calculates the position and distance data such that data generated based on the re-calculated position and distance data and the drawing commands are arranged on the printable area based in the binding margin.

6. A print layout device, which serves as a host computer for providing a layout for a recording sheet and generating a print job to be sent to a printer, said print layout device comprising:

a margin setter adapted to set a margin for a sheet;

a spooler adapted to spool drawing commands based on a print request provided by an application in a memory;

a data re-calculator adapted to re-calculate position and distance data associated with the drawing commands spooled by said spooler in the memory for each logical page provided by the application, in consonance with a printable area of a physical page obtained based on the margin set by said margin setter; and a print job generator adapted to generate a print job comprising at least one printer control command by a physical page unit, based on the drawing commands and the position and distance data re-calculated by said data re-calculator, wherein, when the drawing commands correspond to a plurality of logical pages to be printed on one sheet, said data re-calculator is adapted to perform a process for recalculating the position and distance data associated with the drawing commands for each of the plurality of logical pages such that data generated based on the re-calculated position and distance data and the drawing commands are centered in the printable area.

7. A print layout device, which serves as a host computer, for providing a layout for a recording sheet and generating a print job to be sent to a printer, said print layout device comprising:

margin setting means for setting a margin for a sheet;

spooling means adapted to spool drawing commands based on a print request provided by an application in a memory;

data re-calculating means for re-calculating position and distance data associated with the drawing commands spooled by said spooler in the memory for each logical page provided by the application, in consonance with a printable area of a physical page obtained based on the margin set by said margin setting means; and generating means for generating a print job comprising at least one printer control command by a physical page unit, based on the drawing commands and the position and distance data re-calculated by said data re-calculating means, wherein, when the drawing commands correspond to a plurality of logical pages to be printed on one sheet, said data re-calculating means performs a process for re-calculating the position and distance data associated with the drawing commands for each of the plurality of logical pages such that data generated based on the re-calculated position and distance data and the drawing commands are centered in the printable area.

8. A print layout method for providing a layout for a recording sheet and generating a print job to be sent to a printer, said print layout method comprising the steps of:

setting a margin for a sheet;

spooling drawing commands based on a print request provided by an application in a memory;

re-calculating position and distance data associated with the drawing commands spooled in said spooling step in the memory in each logical page provided by the application, in consonance with a printable area of a physical page obtained based on the margin set in said margin setting step; and generating a print job comprising at least one printer control command by a physical page unit, based on the drawing commands and the position and distance data re-calculated in said data re-calculating step, wherein, when the drawing commands correspond to a plurality of logical pages to be printed on one sheet, said data re-calculating step includes performing a process for re-calculating the position and distance data associated with the drawing commands for each of the plurality of logical pages such that data generated based on the re-calculated position and distance data and the drawing commands are centered in the printable area.

9. A print layout program for providing a layout for a recording sheet and generating a print job to be sent to a printer, said print layout program comprising:

program code for setting a margin for a sheet;

program code for spooling drawing commands based on a print request provided by an application in a memory;

program code for re-calculating position and distance data associated with the drawing commands spooled by said program code for spooling in the memory for each logical page provided by the application, in consonance with a printable area of a physical page obtained based on the margin set by execution of said program code for margin setting; and program code for generating a print job comprising at lease one printer control command by a physical page unit, based on the drawing commands and the position and distance data re-calculated by execution of said program code for data re-calculating, wherein, when the drawing commands correspond to a plurality of logical pages to be printed on one sheet, said program code for data re-calculating also effects a process for re-calculating the position and distance data associated with the data commands for each of the plurality of logical pages such that data generated based on the re-calculated position and distance data and the drawing commands are centered in the printable area.

10. A memory medium storing computer executable instructions for performing a print layout method for providing a layout for a recording sheet and generating a print job to be sent to a printer, said print layout method comprising the steps of:

setting a margin for a sheet;

a spooler adapted to spool drawing commands based on a print request provided by an application in a memory;

re-calculating position and distance data associated with the drawing commands spooled by said spooler in the memory for each logical page provided by the application, in consonance with a printable area of a physical page obtained based on the margin set in said margin setting step; and generating a print job comprising at least one printer control command by a physical page unit, based on the drawing commands and the position and distance data re-calculated in said data re-calculating step, wherein, when the drawing commands correspond to a plurality of logical pages to be printed on one sheet, said data re-calculating step includes performing a process for re-calculating the position and distance data associated with the drawing commands for each of the plurality of logical pages such that data generated based on the re-calculated position and distance data and the drawing commands are centered in the printable area.

* * * * *

UNITED STATES PATENT AND TRADEMARK OFFICE
CERTIFICATE OF CORRECTION

| | |
|---|---|
| PATENT NO. | : 7,084,995 B2 |
| APPLICATION NO. | : 09/863462 |
| DATED | : August 1, 2006 |
| INVENTOR(S) | : Yasuo Mori et al. |

Page 1 of 1

It is certified that error appears in the above-identified patent and that said Letters Patent is hereby corrected as shown below:

<u>COLUMN 9</u>:
Line 6, "split" should read -- splits --; and
Line 54, "effect" should read -- affect --.

<u>COLUMN 18</u>:
Line 35, "lease" should read -- least --.

Signed and Sealed this

Twenty-ninth Day of May, 2007

JON W. DUDAS
*Director of the United States Patent and Trademark Office*